United States Patent [19]

Takagi

[11] Patent Number: 5,452,049
[45] Date of Patent: Sep. 19, 1995

[54] CAMERA WITH ADJUSTMENT AND RECORDING OF COLOR TEMPERATURE

[75] Inventor: Tadao Takagi, Yokohama, Japan

[73] Assignee: Nikon Corporation, Tokyo, Japan

[21] Appl. No.: 320,976

[22] Filed: Oct. 11, 1994

Related U.S. Application Data

[63] Continuation of Ser. No. 957,918, Oct. 8, 1992, abandoned.

[30] Foreign Application Priority Data

Nov. 18, 1991 [JP] Japan .................. 3-302005
Nov. 18, 1991 [JP] Japan .................. 3-302006

[51] Int. Cl.⁶ .............................. G03B 7/08
[52] U.S. Cl. ......................... 354/430; 354/106
[58] Field of Search ............ 354/145.1, 127.1, 430, 354/105, 106, 290

[56] References Cited

U.S. PATENT DOCUMENTS 4,485,336 11/1984 Yoshiyama et al. ............ 315/241 P
5,006,873 4/1991 Wash ............................. 354/106
5,109,248 3/1992 Petrakos et al. ............... 354/430 X
5,333,113 7/1994 Cloutier ........................ 354/106 X

FOREIGN PATENT DOCUMENTS 60-249477 12/1985 Japan .
1-274736 11/1989 Japan .
2-32312 2/1990 Japan .
2-287225 11/1990 Japan .
3-41428 2/1991 Japan .

Primary Examiner—Howard B. Blankenship
Attorney, Agent, or Firm—Shapiro and Shapiro

[57] ABSTRACT

An information recording camera may comprise a position determining device for determining the position of a main object in a photographing image field, and a recording device for recording information regarding the position of the main object determined by the position determining device onto a recording medium. A device for calculating a color temperature of a flash light source based on the color temperature of natural light may be provided, and the calculated color temperature may be recorded to facilitate subsequent photograph printing by a lab.

13 Claims, 14 Drawing Sheets

CAMERA WITH ADJUSTMENT AND RECORDING OF COLOR TEMPERATURE This is a continuation Ser. No. 07/957,918 filed Oct. 8, 1992, now abandoned.

BACKGROUND OF THE INVENTION

1. Field of the Invention

This invention relates to a camera which can record the position information of a main object in the image field and also can adjust the color temperature of a flashlight source in conformity with the color temperature of natural light in the object field and record the color temperature information onto a recording medium.

2. Related Background Art

An information recording camera for magnetically recording information regarding photographing onto film is known (see U.S. Pat. No. 5,006,873).

Also, a camera for detecting the photographer's visual axis and effecting automatic focus adjustment and automatic exposure calculation at the visual axis position in the image field is known (see Japanese Laid-Open Patent Application No. 2-32312).

Further, an image pickup apparatus for detecting the skin color portion of an object and correcting exposure on the basis of the brightness of the skin color portion in the image field is known (see Japanese Laid-Open Patent Application No. 2-287225).

Furthermore, a focus detecting apparatus which causes the distance measuring field to pursue a moving object in the image field is known (see Japanese Laid-Open Patent Application No. 60-249477).

In these apparatuses, a main object in the image field is caught during photographing and focus adjustment or exposure calculation is effected for the main object. Accordingly, during at least photographing, the position of the main object in the image field is recognized and photographing of proper exposure which is in focus to the main object is effected.

In the above-described apparatuses, however, even though the position of the main object in the image field is recognized during photographing, the information thereof is not transmitted to a lab for carrying out the printing process and therefore, in some cases, the exposure amount during printing is determined with a portion differing from the position of the main object as the reference and print properly done for the main object intended by the photographer is not obtained.

Also, a camera for recording the rate of flashlight emitted from a flashing device and natural light (hereinafter referred to as stationary light) and effecting color balance correction on the basis of this information during the printing in a lab is known (see, for example, Japanese Laid-Open Patent Application No. 3-41428).

Also known is a camera for magnetically recording information regarding photographing onto film (see, for example, U.S. Pat. No. 5,006,873).

In these conventional cameras, however, the balance of color temperature with the background of a main object is not taken into account, and this leads to the problem that depending on scenes, the balance of color temperature is lost, thus resulting in an unnatural photograph.

For example, when the background is an evening glow or tungsten illumination, the background is photographed reddish, whereas a main object such as a person is photographed whitish, thus resulting in a photograph in which the color balance between the main object and the background is unnatural.

SUMMARY OF THE INVENTION

It is an object of the present invention to provide a main object information recording camera for recording the position information of a main object in the image field during photographing.

It is a further object of the present invention to provide a color temperature information recording camera for a flashlight source for optimizing the balance of the color temperatures of a main object and its background and recording the information thereof.

Describing the present invention correspondingly to FIG. 1 of the accompanying drawings, an embodiment of the present invention is provided with a position determining device 100 for determining the position of a main object in the photographing image field, and a recording device 101 for recording information regarding the position of the main object determined by said position determining device 100 onto a recording medium 102, thereby achieving the above object.

The information regarding the position of the main object determined by the position determining device 100 is recorded onto the recording medium 102 by the recording device 101.

The recording device 101A of a main object information recording camera according to another embodiment magnetically records the main object position information onto the recording medium 102.

A recording medium 102A in a main object information recording camera according to another embodiment is film.

The position determining device 100A of a main object information recording camera according to another embodiment detects the position of the photographer's visual axis and determines the position of the main object.

The position determining device 100B of a main object information recording camera according to another embodiment detects a skin color portion in the photographing image field and determines the position of the main object.

The position determining device 100C of a main object information recording camera according to another embodiment determines the position in the photographing image field set by an external operating member 103 as the position of the main object.

Describing another embodiment of the present invention correspondingly to FIG. 2 of the accompanying drawings, this embodiment is provided with a flashing device 200 for illuminating the object field, a color temperature metering device 201 for metering the color temperature of natural light in the object field, a flashlight color temperature calculating device 202 for calculating the color temperature of the light source of the flashing device 200 on the basis of the color temperature of natural light, a flashlight color temperature adjusting device 203 for adjusting the color temperature of the light source of the flashing device 200 to the color temperature calculated by the flashlight color temperature calculating device 202, and a recording device 205 for recording the color temperature information calculated by the flashlight color temperature calculating device 202 onto a recording medium 204, thereby achieving the above object.

In this embodiment, the color temperature of the light source of the flashing device 200 is calculated by the flashlight color temperature calculating device 202 on the basis of the color temperature of natural light metered by the color temperature metering device 201, the color temperature of the light source of the flashing device 200 is adjusted by the flashlight color temperature adjusting device 203 so as to become the color temperature calculated by the flashlight color temperature calculating device 202 and the color temperature information calculated by the flashlight color temperature calculating device 202 is recorded onto the recording medium 204 by the recording device 205.

The recording device 205A of a color temperature information recording camera for a flashlight source according to another embodiment magnetically records color temperature information onto a recording medium 204A.

A recording medium 204B in a color temperature information recording camera for a flashlight source according to another embodiment is silver salt film.

DESCRIPTION OF THE PREFERRED EMBODIMENTS

Figure 1:
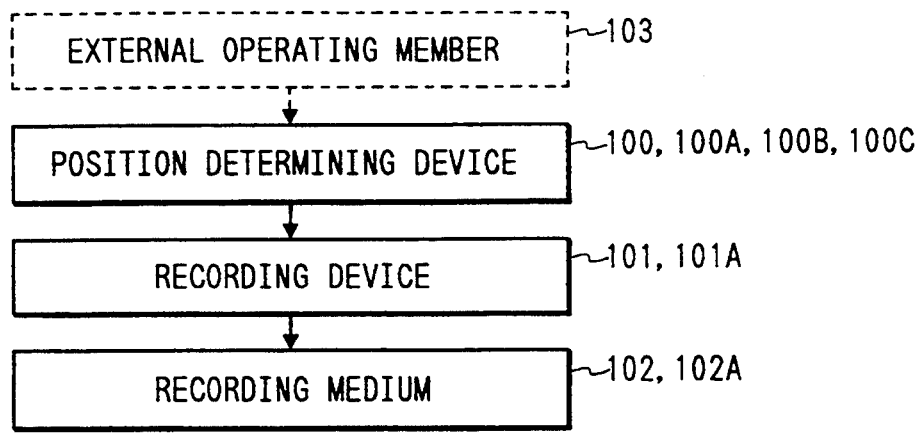
FIG. 1 is a schematic diagram showing a construction of the present invention.
Figure 2:
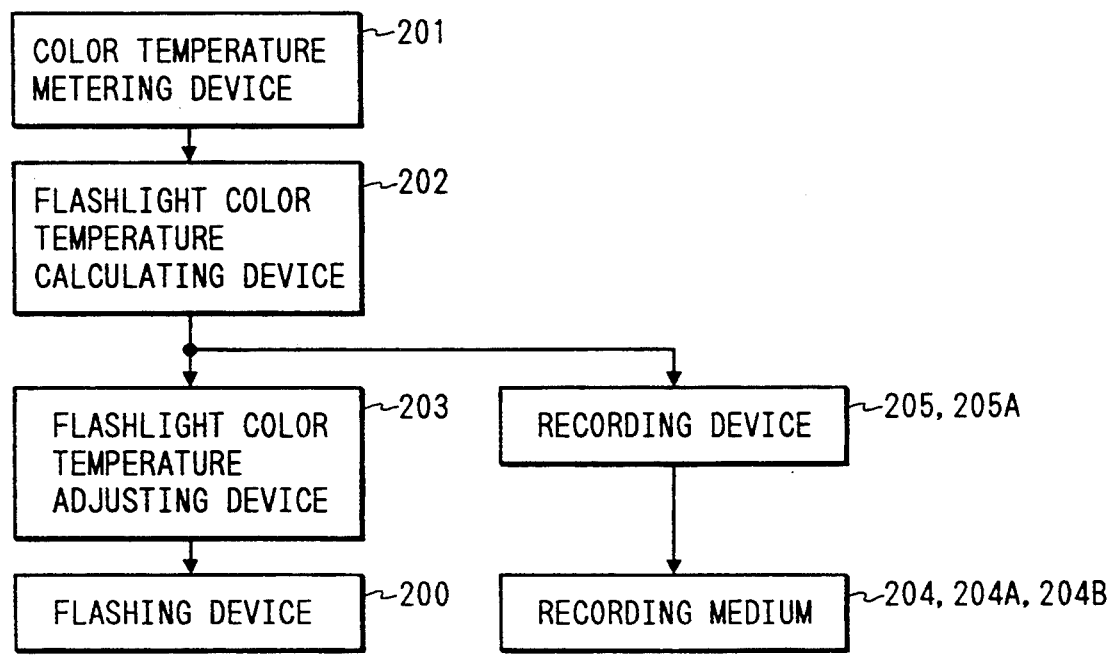
FIG. 2 is a schematic diagram showing another construction of the present invention.
Figure 3:
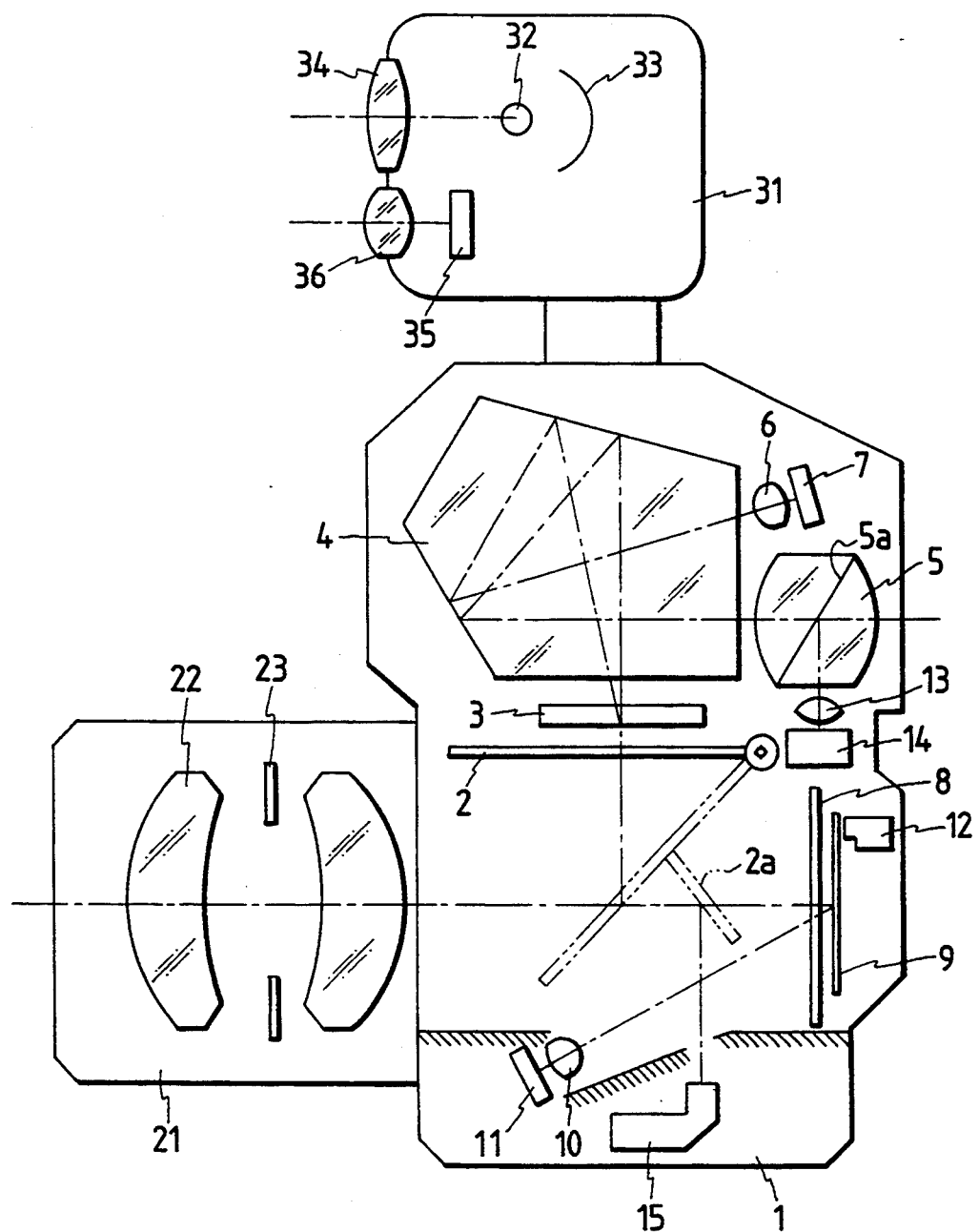
FIG. 3 shows the TTL automatic light modulation camera of the present invention.

FIG. 3 shows the TTL automatic light modulation camera of the present invention.

A camera body 1 has removably mounted thereon a photo-taking lens barrel 21 and an electronic flash device 31.

During finder observation, a light beam passed through a photo-taking lens 22 (stationary light) is reflected by a mirror 2 which is in its down position indicated by broken line, and passes through a screen 3 and a pentagonal prism 4, and a part of the light beam is directed to an eyepiece 5 and the other part of the light beam passes through a condensing lens 6 and is directed to a photometric element 7 for exposure calculation. Also, light passed through the mirror 2 is reflected by a sub-mirror 2a and is directed to a focus detecting device 15.

Also, during photographing, when a shutter release button, not shown, is released, the mirror 2 is driven to its up position indicated by solid line, whereafter a stop 23 is stopped down and a shutter 8 is opened. Thereby, the object light passed through the photo-taking lens 22 is directed to film 9, which is thus exposed to the light.

During flash photographing, after the shutter 8 is opened, the xenon tube 32 of the electronic flash device 31 effects main light emission and illuminates an object through an irradiation lens 34. The reflected light from the object passes through the photo-taking lens 22 to the surface of the film, and the light beam reflected by the surface of the film is received by a light receiving element 11 for light modulation through a condensing lens 10, and light modulation is effected on the basis of the result of this photometry. The reference numeral 33 designates a reflector.

A visual axis detecting device 14 detects the gaze point position of the visual axis of the photographer's eye through a visual axis detecting lens 13 and a half mirror 5a in the eyepiece 5. A recording device 12, as disclosed in U.S. Pat. No. 5,006,873, records information regarding the position of a main object onto a magnetic track provided on the film 9.

A color temperature metering element 35 meters the color temperature of the object field through a condensing lens 36. In this embodiment, the recording device 12 magnetically records the color temperature of flashlight onto the film 9 as an external recording medium, and if required during the printing in a lab, color balance correction is effected on the basis of that information.

Figure 4:
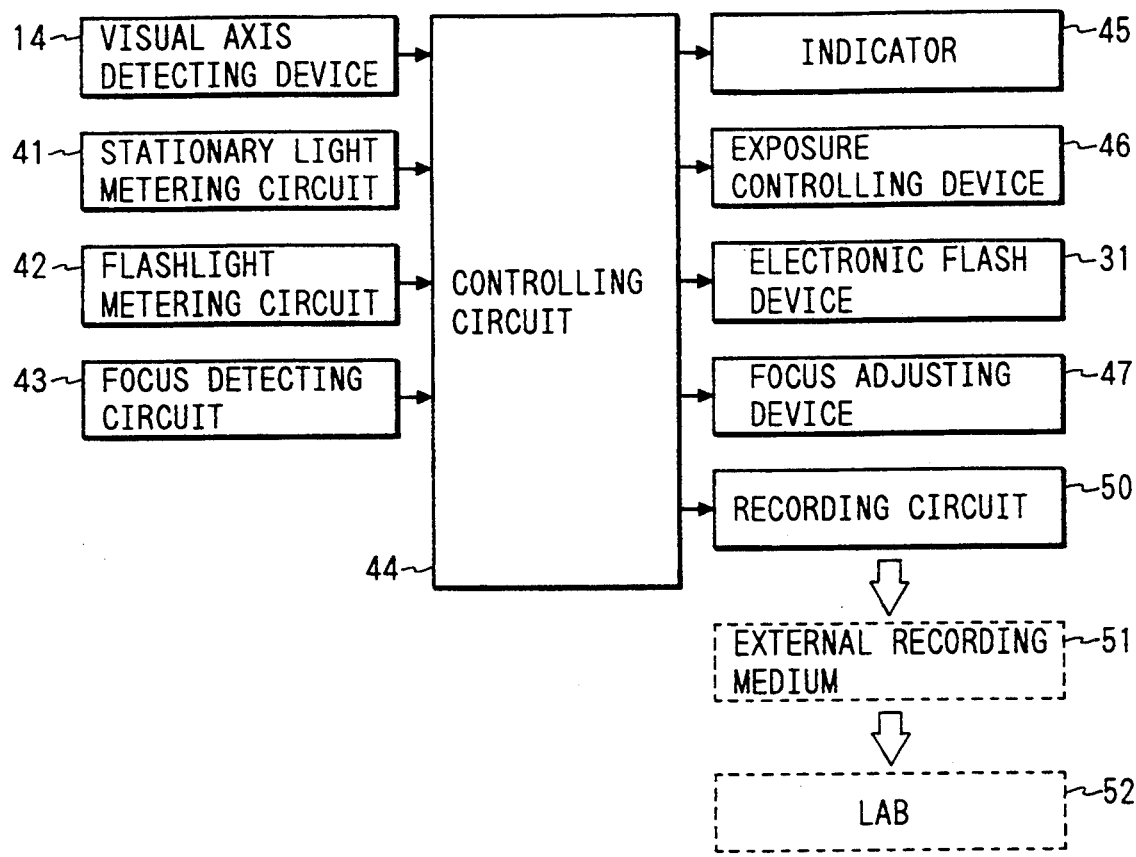
FIG. 4 is a block diagram showing the construction of the present invention.

FIG. 4 is a block diagram showing the construction of an embodiment of the present invention. In FIG. 4, the same devices as those shown in FIG. 3 are given the same reference numerals and need not be described.

In FIG. 4, the reference numeral 41 designates a stationary light metering circuit for metering stationary light received by the photometric element 7 for exposure calculation. The reference numeral 42 denotes a flashlight metering circuit for metering the reflected light of the flashlight from the object field received by the light receiving element 11 for light modulation. The reference numeral 43 designates the focus detecting circuit of the focus detecting device 15 for detecting the focus adjusted state of the photo-taking lens 22. The reference numeral 44 denotes a controlling circuit comprised of a microcomputer and its surrounding parts. The controlling circuit 44 effects the sequence control of the camera and various calculations and also effects the information recording control of the position of the main object.

The reference numeral 45 designates an indicator for effecting the indication of exposure and focus. The reference numeral 46 denotes an exposure controlling device for controlling the shutter 8 and the stop 23 on the basis of the exposure value calculated by the controlling circuit 44. The reference numeral 47 designates a focus adjusting circuit for driving the photo-taking lens 22 in accordance with the amount of lens driving and the direction of driving calculated by the controlling circuit 44.

The reference numeral 50 denotes a recording circuit for recording information regarding the position of the main object onto a magnetic track applied to the film, by the recording device 12. The reference numeral 51 designates an external recording medium onto which information regarding photographing is to be recorded and which, in this embodiment, is silver salt film provided with a magnetic track thereon. The reference numeral 52 denotes a lab for effecting the development and printing of the film 51 in accordance with the photographing information such as the position of the main object recorded on the film.

Figure 5:
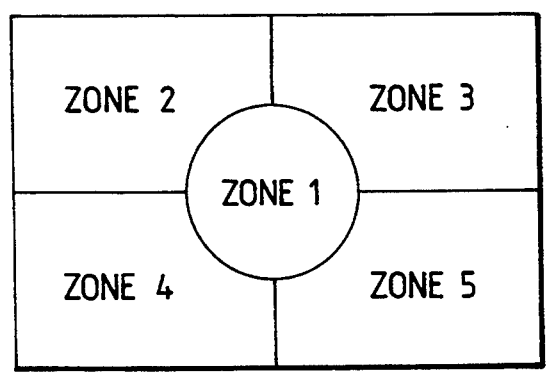
FIG. 5 shows the zone division of a visual axis detecting device and a photometric element for exposure calculation.

FIG. 5 shows the divided zones of the visual axis detecting device 14 and the photometric element 7 for exposure calculation.

The visual axis detecting device 14 divides the photographing image field into five zones, i.e., ZONEs 1-5, and detects in which zone the photographer's visual axis in the finder is located. As this visual axis detecting device 14, use is made, for example, of a device which applies infrared illuminating light to the observer's eye and detects the position of a gaze point from the reflected image from the cornea or the crystalline lens of the eye (see, for example, Japanese Laid-Open Patent Application No. 1-274736).

The photometric element 7 for exposure calculation, like the visual axis detecting device 14, divides the photographing image field into five zones, ZONEs 1-5, and receives stationary light by each zone. It outputs an electrical signal conforming to the intensity of the stationary light to a stationary light metering circuit 41.

Figure 6:
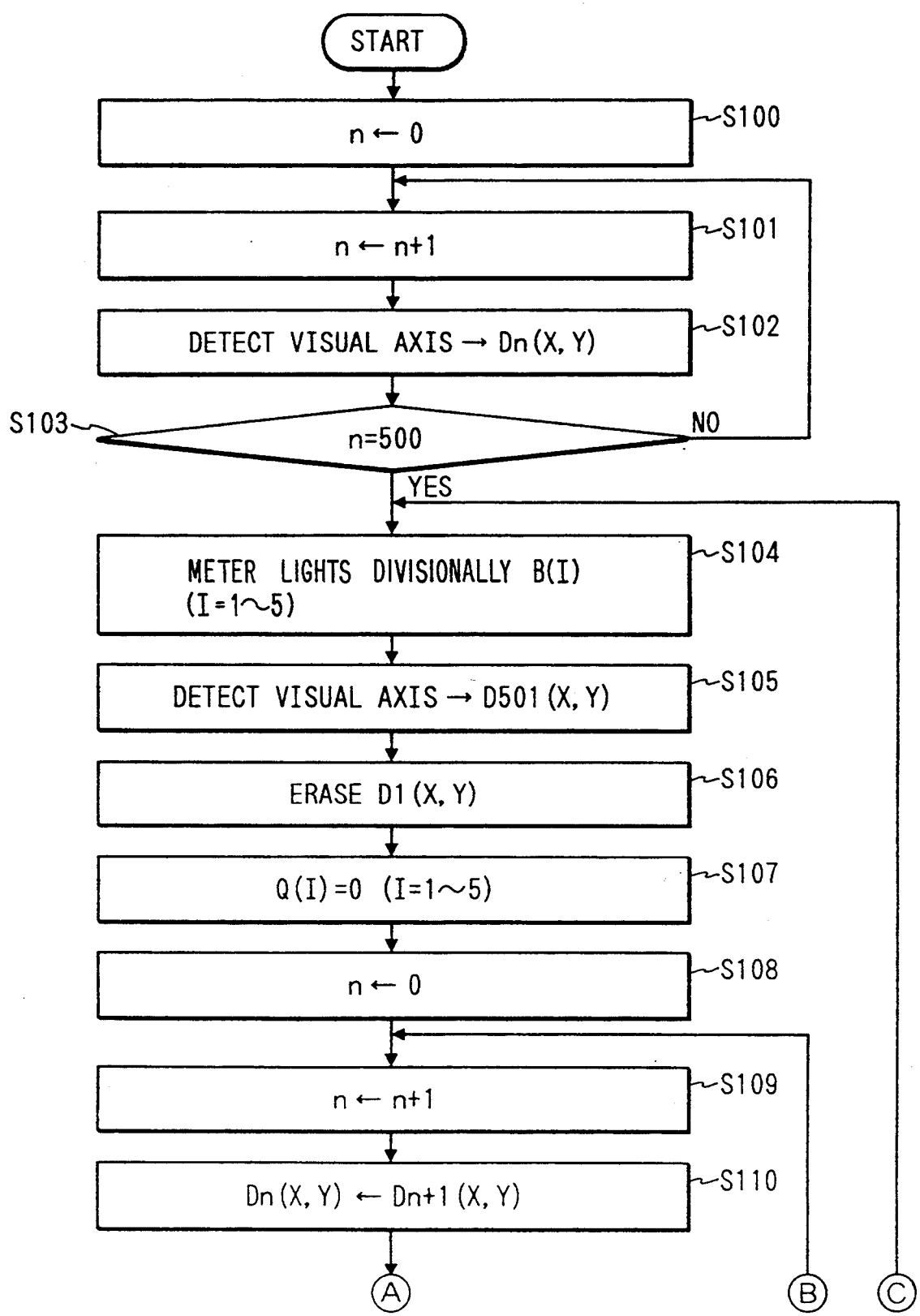
FIGS. 6 to 8 are flow charts showing the determination of the position of a main object and a recording process program for the position information thereof.
Figure 7:
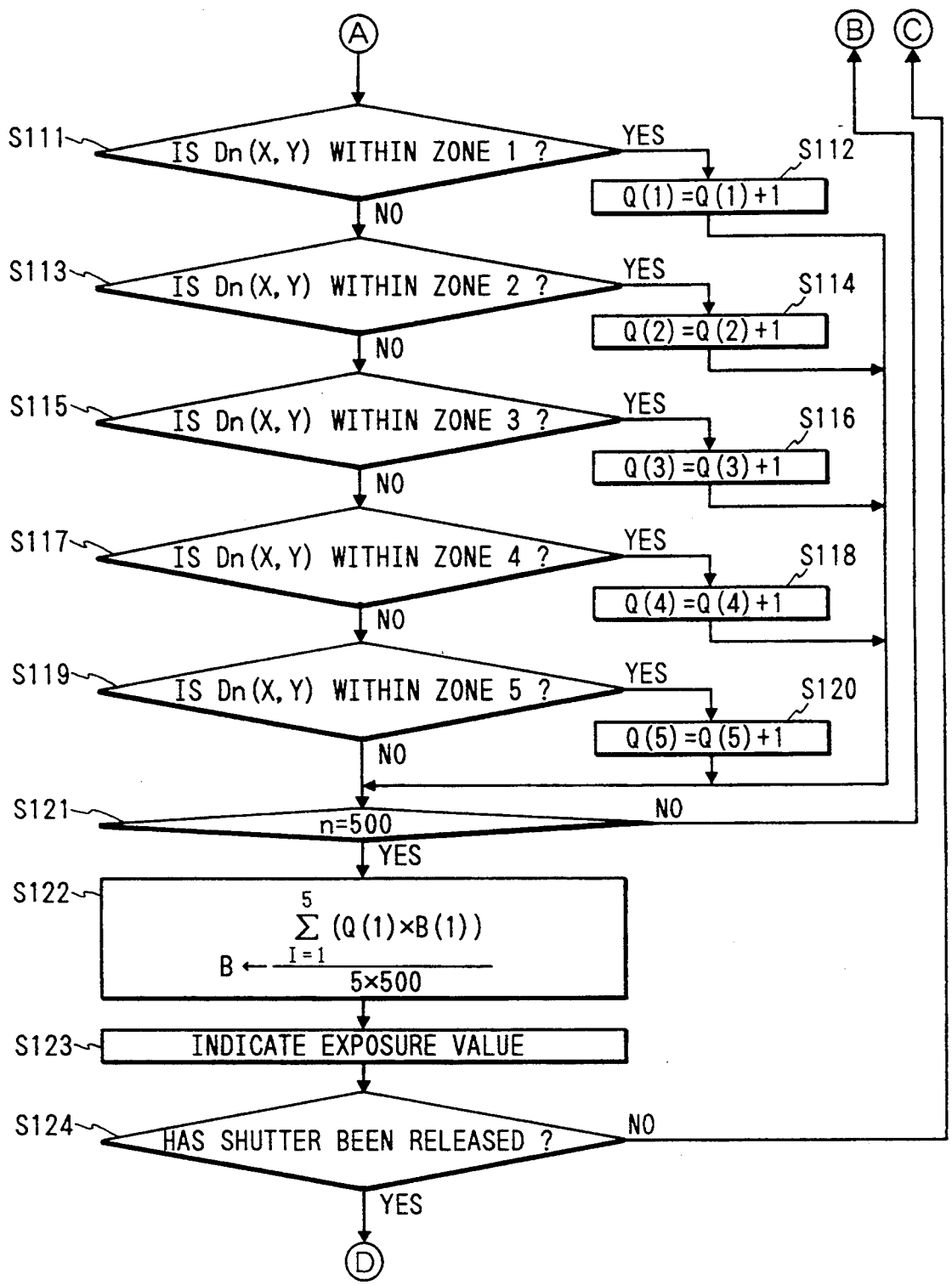
Figure 8:
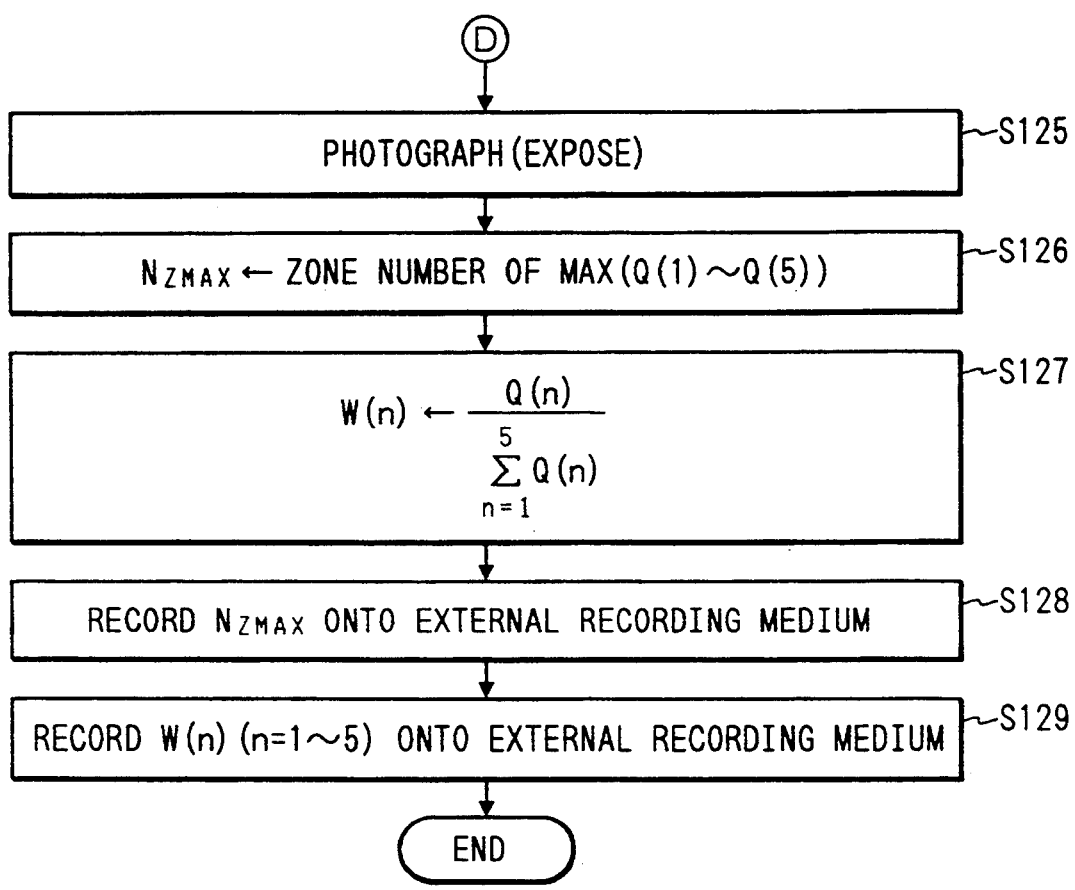

FIGS. 6 to 8 are flow charts showing a control program executed by the microcomputer of the controlling circuit 44. The determination of the position of the main object and the recording operation for the position information will now be described with reference to these flow charts.

At a step S100, n indicative of the frequency of visual axis detection is reset, and at the next step S101, the frequency n is incremented. At a step S102, the first visual axis detection is effected. The position of the photographer's visual axis is represented by X-Y coordinates having the center of the finder as the origin, and the coordinates are measured to thereby detect in which of the zones shown in FIG. 5 the photographer's visual axis is located The coordinates data is memorized as Dn(X, Y) in the memory of the controlling circuit 44. In this embodiment, the detection of the position of the visual axis is effected 500 times at intervals of 5 ms. At a step S103, whether the detection of the position of the visual axis has been effected 500 times is discriminated, and if said detection has been effected 500 times, advance is made to a step S104. At the step S104, the object brightness B(I) (I being a variable corresponding to ZONEs 1-5 and I=1-5) is metered for each of ZONEs 1-5 by the photometric element 7 for exposure calculation and the stationary light metering circuit 41.

Subsequently, at a step S105, the 501st detection of the position of the visual axis is effected, and the data of the detected position of the visual axis is memorized as D501 (X, Y). At the next step S106, the data Di(X, Y) of the first position of the visual axis which is oldest is erased to thereby renew the data. At a step S107, a variable Q(I) (I=1-5) indicative of the frequency of gazing for each of ZONEs 1-5 is reset. At a step S108, the frequency n of the detection of the visual axis is reset, and at the next step S109, the frequency n is incremented. At a step S110, the coordinates data Dn ( X, Y ) are substituted for by coordinates data Dn+i(X, Y).

In this manner with the lapse of time, the coordinates data of the position of the visual axis are sequentially changed to the newest data and the number of the coordinates data are always kept at 500. Accordingly, also by time being spent for framing or the like, the coordinates data of the newest position of the visual axis are obtained.

Subsequently, from the coordinates data of the found position of the visual axis, the zone to which they belong, that is, the frequency Q(I) of gazing at each zone, is found.

At the step S111 of FIG. 7, whether Dn(X, Y) is within ZONE 1 is discriminated, and if the answer is affirmative, advance is made to a step S112, where a variable Q(1) indicative of the frequency of gazing of the visual axis in ZONE 1 is incremented. If the step S111 is negative, advance is made to a step S113, where whether the coordinates data Dn(X, Y) is within ZONE 2 is discriminated, and if the answer is affirmative, advance is made to a step S114, where the frequency Q(2) of gazing at ZONE 2 is incremented. If the step S113 is negative, advance is made to a step S115, where whether the coordinates data Dn (X, Y) is within ZONE 3 is discriminated, and if the answer is affirmative, advance is made to a step S116, where the frequency Q(3) of gazing at ZONE 3 is incremented.

If the step S115 is negative, advance is made to a step S117, where whether the coordinates data Dn(X, Y) is within ZONE 4 is discriminated, and if the answer is affirmative, advance is made to a step S118, where the frequency Q(4) of gazing at ZONE 4 is incremented. If the step S117 is negative, advance is made to a step S119, where whether the coordinates data Dn(X, Y) is within ZONE 5 is discriminated, and if the answer is affirmative, advance is made to a step S120, where the frequency Q(5) of gazing at ZONE 5 is inremented.

If the step S119 is negative, that is, if the coordinates data Dn(X, Y) is not within ZONEs 1-5, at a step S121, whether the frequency n has reached 500 times is discriminated, and if the frequency n has not reached 500 times, return is made to the step S109 of FIG. 6, and if the frequency n has reached 500 times, advance is made to a step S122.

Since as described above, the detection of the visual axis is effected at intervals of 5 ms, the frequency Q(I) (I=1-5) of gazing at each ZONE 1-5 corresponds to the total time for which ZONEs 1-5 have been gazed at during a predetermined time. At the step S122, on the basis of each detected gazing time, weighting is effected on the exposure value B by the following equation:

$$B = \Sigma(Q(I) \times B(I))/(5 \times 500), \quad (1)$$

where $\Sigma$ represents the sum total of I=1-5.

That is, the frequencies Q(1)-Q(5) of gazing each are divided by 500 to thereby find the proportion of the gazing time at ZONEs 1-5, and this proportion is multiplied by the object brightness B(I) (I=1-5) metered for each of ZONEs 1-5 at the above-mentioned step to thereby find the arithmetical mean, and weighting is effected on the exposure value 13. Thus, the exposure value B is determined by the photographer's gazing time at ZONEs 1–5, and the photographer's intention is fully reflected in exposure control.

The weighting on the exposure value B may be effected by the following equation:

$$B = \Sigma(Q(I)^2 \times B(I))/(5 \times \Sigma(Q(I)^2)), \quad (1')$$

where $\Sigma$ represents the sum total of I=1–5.

According to this method, weighting on each photometric output is effected by the moment of the square of the gazing time and therefore, as compared with the case where equation (1) above is used, more importance can be attached to the zone of a long gazing time.

Also, weighting on the exposure value B may be effected by only the frequency of gazing.

Subsequently, at an step S123, the calculated exposure value B is indicated by the indicator 45. At a step S124, whether the shutter has been released is discriminated, and if the shutter has not been released, return is made to the step S104 of FIG. 6, and if the shutter has been released, advance is made to the step S125 of FIG. 8.

At the step S125, the exposure controlling device 46 is controlled to thereby effect exposure. After the exposure, at a step S126, the zone of the greatest frequency of gazing is detected. The zone of the greatest frequency of gazing is defined as the area in which the main object exists, and the area number thereof is defined as $N_{zmax}$. At the next step S127, the proportion W(n) (n=1–5) of the frequencies Q(1)–Q(5) of gazing at ZONEs 1–5 is found.

$$W(n) = Q(n)/\Sigma Q(n), \quad (2)$$

where $\Sigma$ represents the sum total of n=1–5. At a step S128, the recording circuit 50 is controlled, whereby the area number $N_{zmax}$ of the greatest frequency of gazing is recorded as the area in which the main object exists onto the external recording medium 51. Further, at a step S129, the proportion W(n)(n=1–5) is recorded onto the external recording medium 51.

Figure 9:
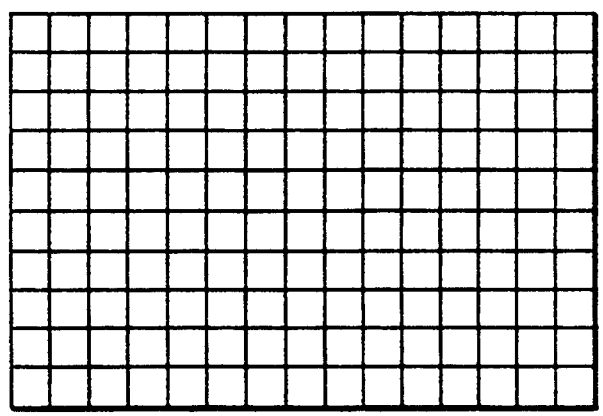
FIG. 9 shows a visual axis detecting device and an example of the area division of a photometric element for exposure calculation.

In the above-described embodiment, the number of zone divisions of the visual axis detecting device 14 and the photometric element 7 for exposure calculation is five as shown in FIG. 5, whereas the number of zone divisions and the shape of the zones are not restricted to the above-described embodiment, but the zones may be finely divided as shown, for example, in FIG. 9.

Also, in the above-described embodiment, the shape of the divided zones of the visual axis detecting device 14 and the shape of the divided zones of the photometric element 7 for exposure calculation are the same, but alternatively, they may be different from each other.

Figure 10:
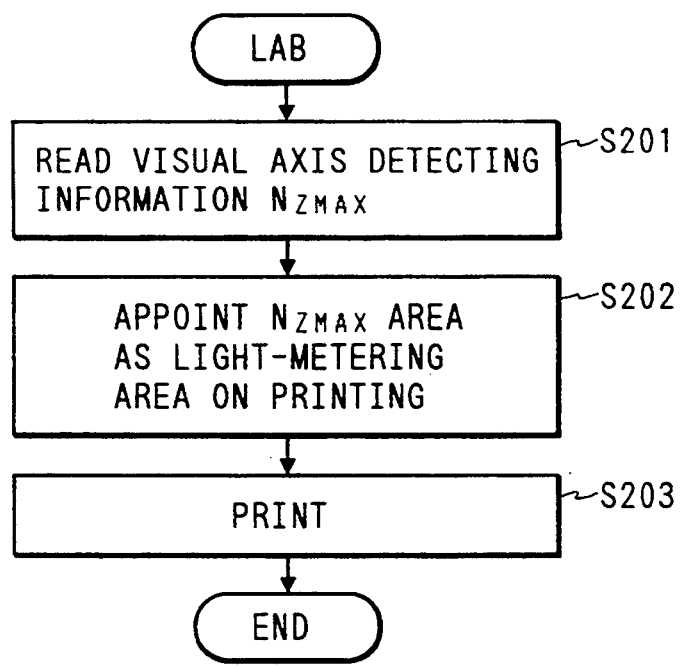
FIG. 10 is a flow chart showing the printing process in a lab.

FIG. 10 is a flow chart showing the processing procedure in the lab for the external recording medium 51 on which the position information of the main object is recorded. In the lab, at a step S201, the area of the greatest frequency of gazing, i.e., the number $N_{zmax}$ of the area in which the main object exists, is first read from the external recording medium 51. Subsequently, at a step S202, the area $N_{zmax}$ is appointed as the light-metering area during printing. At a step S203, printing is effected so that the optimum density may be provided in the appointed light-metering area.

Figure 11:
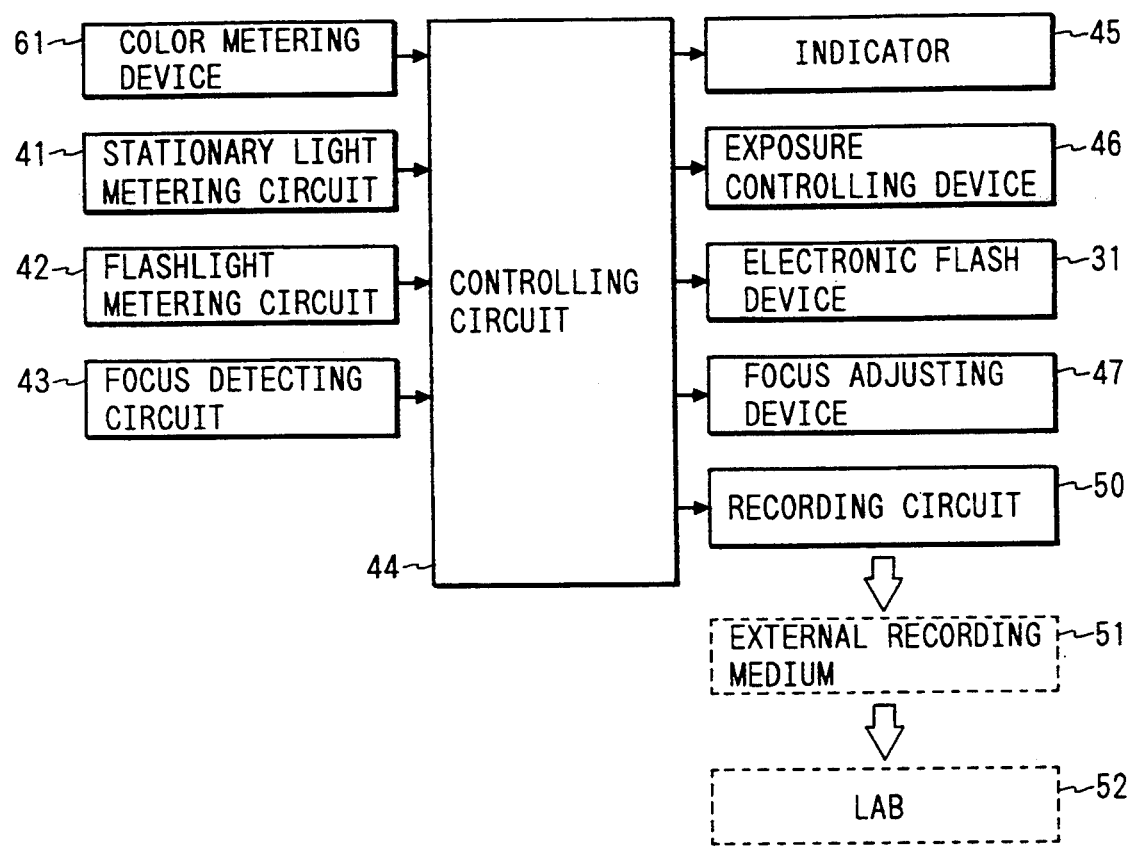
FIG. 11 is a block diagram showing the construction of another embodiment.

In the above-described embodiment, the area in which the main object exists is determined on the basis of the position of the photographer's visual axis detected by the visual axis detecting device 14, but alternatively, as shown in FIG. 11, a color metering device 61, instead of the visual axis detecting device 14 of FIG. 4, may be used to determine the area in which the main object exists.

The color metering device 61 detects a skin color portion in the photographing image field, and judges this skin color portion as a person, i.e., the main object, and sends the area number thereof to the controlling circuit 44. The controlling circuit 44 records that area number onto the external recording medium 51 and transmits it to the lab.

Figure 12:
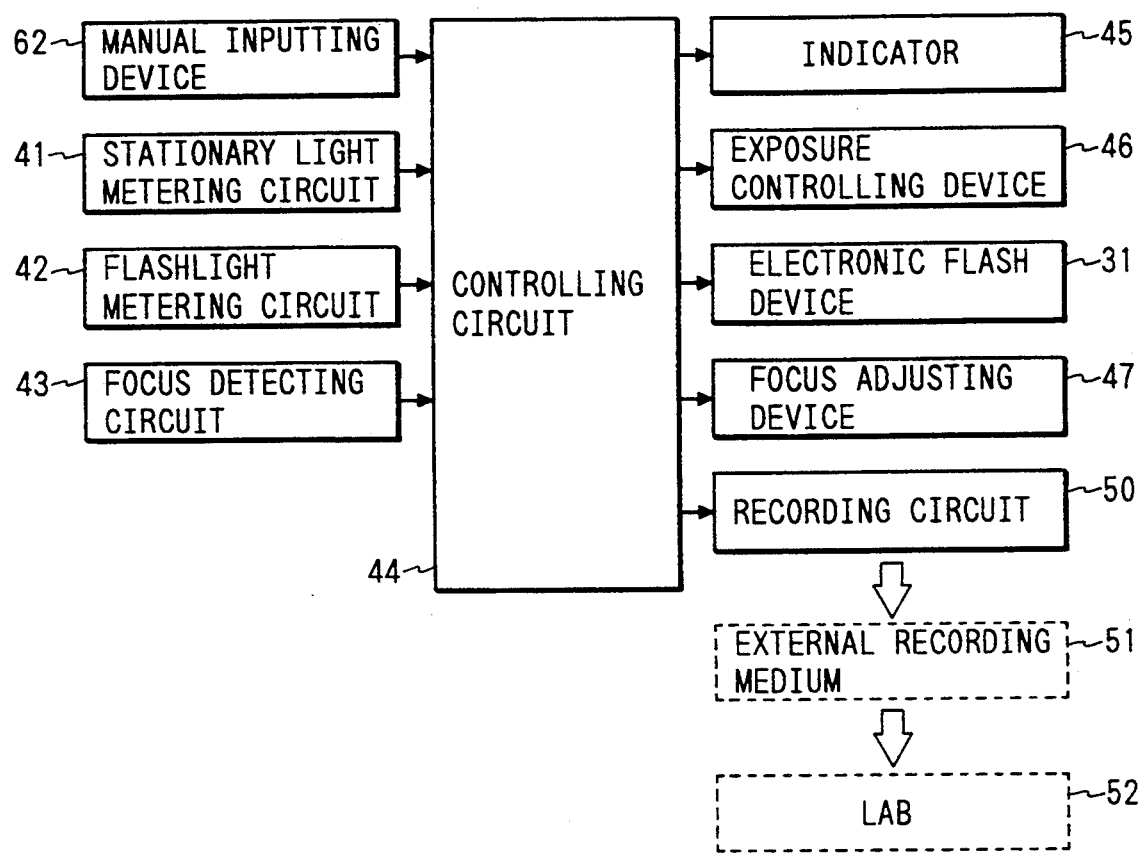
FIG. 12 is a block diagram showing the construction of another embodiment.

Also, as shown in FIG. 12, a manual inputting device 62, instead of the visual axis detecting device 14 of FIG. 4, may be used to determine the area in which the main object exists. That is, the area in the photographing image field in which the intended object exists is set by the manual inputting device 62. The area number of this area is sent to the controlling circuit 44, is recorded as the area in which the main object exists onto the external recording medium 51, and is transmitted to the lab.

As described herein, design is made such that the position of the photographer's visual axis is detected and the area in which the main object exists is determined on the basis of the detected position of the visual axis and is magnetically recorded on the magnetic track on the film and therefore, during the printing in the lab, printing is effected with that area as the reference and thus, print properly done for the main object intended by the photographer is obtained.

Also, the area in which the main object exists may be determined by detecting a skin color portion in the photographing image field and on the basis of the result of the detection, or alternatively, the area in which the main object exists may be manually set. In any case, an effect similar to that described above is obtained.

In the above-described embodiments, the external recording medium has been described as a magnetic recording medium applied onto film, but alternatively, a magnetic recording medium may be applied onto the surface of a film cartridge and information may be recorded thereon, or information may be recorded on a memory device such as an IC card.

The information recording system is not restricted to a magnetic recording system. The information may be optically recorded, for example, on film.

In the construction of the above-described embodiment, the visual axis detecting device 14, the color metering device 61, the manual inputting device 62 and the controlling circuit 44 together constitute position determining means, the recording device 12 and the recording circuit 50 together constitute recording means, and the manual inputting device 62 constitutes an external operating member.

As described above, according to the present invention, design is made such that the position of the main object in the photographing image field is determined and the information of this position of the main object is recorded on the recording medium and therefore, during the printing in the lab, printing is effected with that position as the reference and thus, there is obtained print properly done for the main object intended by the photographer.

Figure 13:
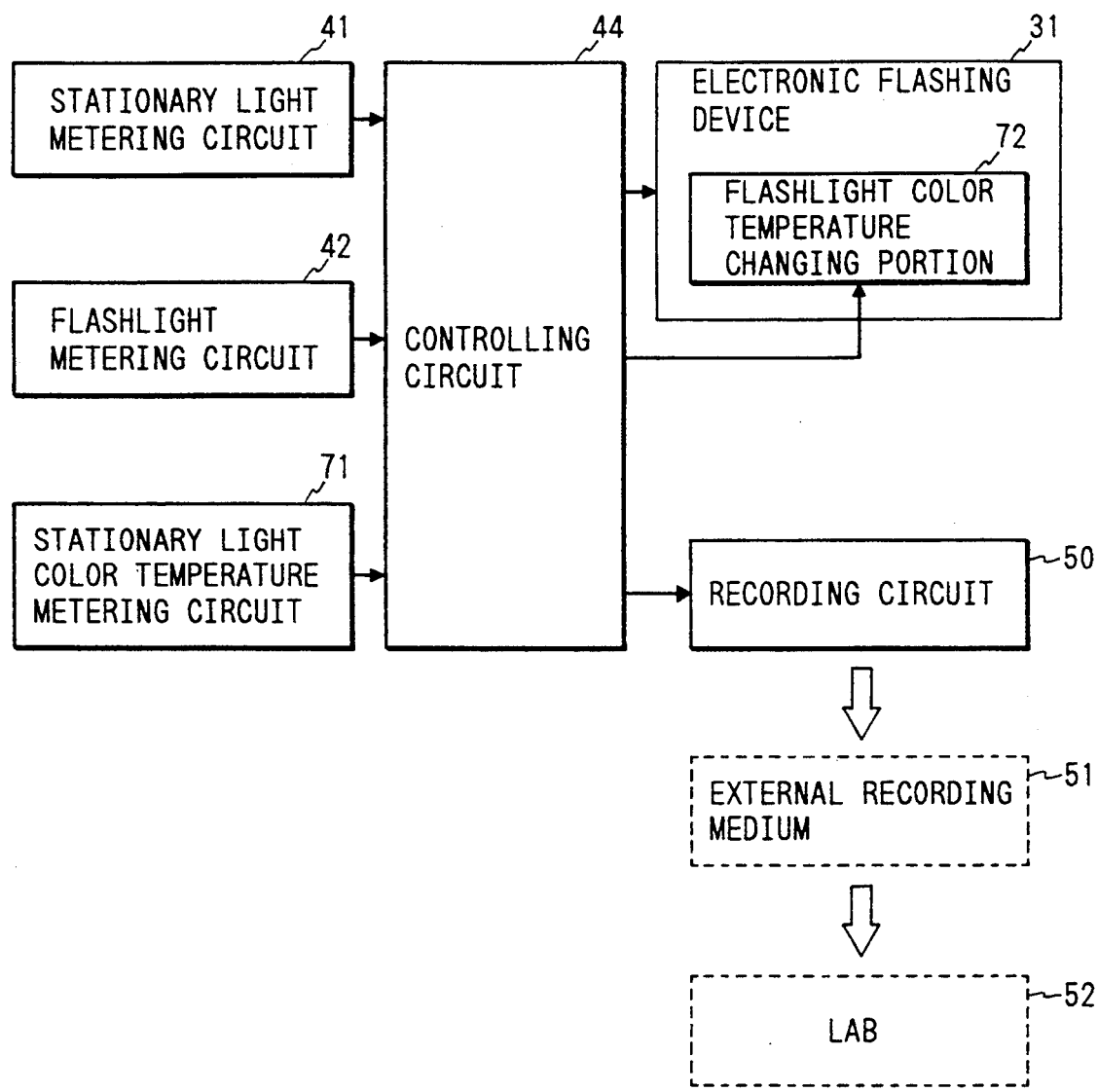
FIG. 13 is a block diagram showing the construction of another embodiment.

FIG. 13 is a block diagram showing the construction of another embodiment. In FIG. 13, devices similar to those shown in FIG. 4 are given similar reference numerals and need not be described.

The reference numeral 71 designates a stationary light color temperature metering circuit for metering the color temperature of stationary light received by the color temperature metering element 35.

The reference numeral 44 denotes a controlling circuit comprised of a microcomputer and its surrounding parts. The controlling circuit 44 effects the sequence control of the camera and various calculations and also executes a control program which will be described later to thereby control the color temperature of flashlight emitted from the electronic flash device 31 and cause the information thereof to be recorded onto the film 9.

The reference numeral 72 designates a flashlight color temperature changing portion for adjusting the color temperature of the flashlight of the electronic flash device 31 on the basis of a color temperature command signal from the control circuit 44. The reference numeral 50 denotes a recording circuit for magnetically recording the color temperature information of the flashlight onto an external recording medium 51, i.e., film, 9, through the recording device 12. The reference numeral 52 designates a lab for carrying out the printing process on the basis of the color temperature information of the flashlight recorded on the magnetic track on the film 9.

Figure 14:
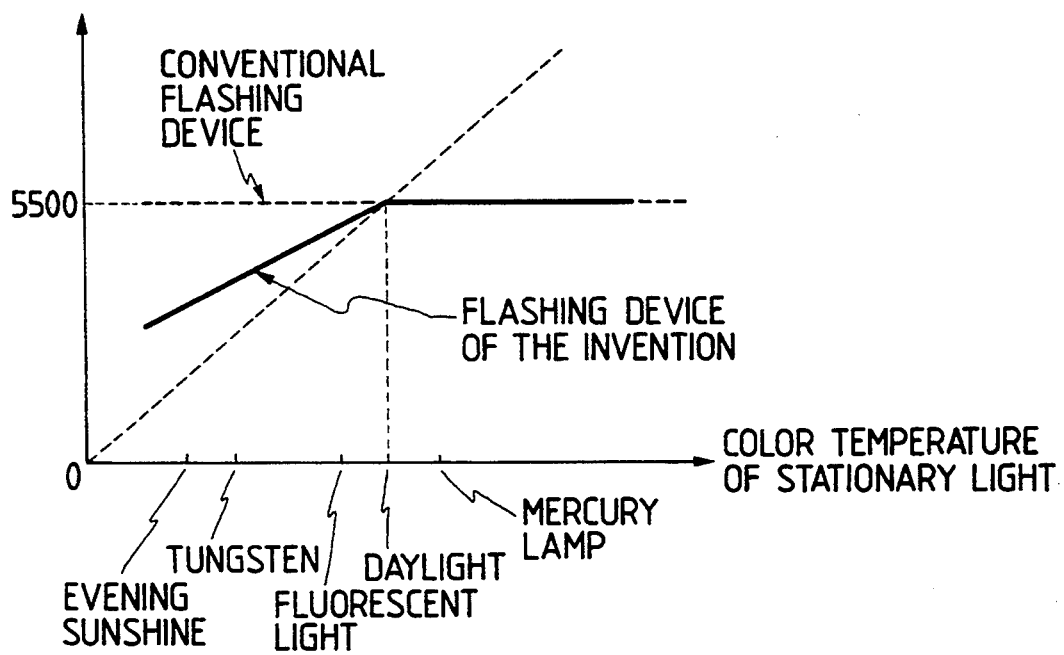
FIG. 14 is a graph showing the relation of the color temperature of a flashlight source to the color temperature of stationary light.

FIG. 14 shows the relation of the color temperature of the flashlight source to the color temperature of stationary light.

The color temperature of the flashlight source of the conventional flash device has been constant, e.g. 5500[K], independently of the color temperature of stationary light.

In this embodiment,
(1) when the color temperature of stationary light is less than 5500[K], the color temperature of the flashlight source is changed toward the color temperature of stationary light, and
(2) when the color temperature of stationary light is 5500[K] or higher, the color temperature of the flashlight source is fixed at 5500[K].

According to the former, when the background is an evening glow or tungsten illumination, a main object such as a person illuminated by a red light source becomes somewhat reddish and unnaturalness disappears. Also, according to the latter, a person becoming bluish, as is generally disliked, is prevented.

Figure 15:
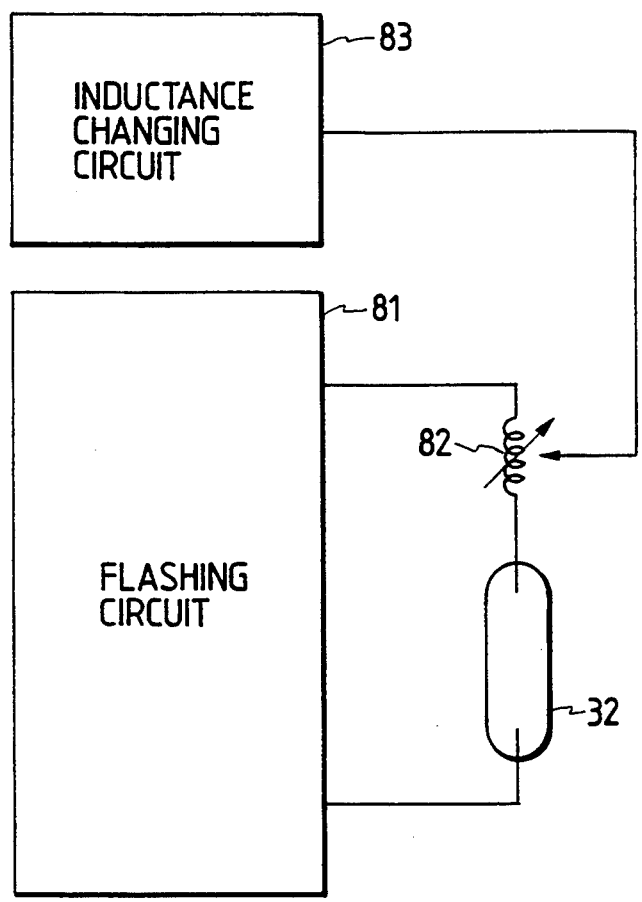
FIG. 15 shows an example of a flashlight color temperature changing portion.

FIG. 15 shows an example of the flashlight color temperature changing portion 72.

A xenon tube 32, when supplied with an electric current little by little, provides a gradual rise of light emission and becomes low in color temperature. When suddenly supplied with an electric current, it provides a sharp rise of light emission and becomes high in color temperature. The flashlight color temperature changing portion 72 shown in FIG. 15 utilizes such properties of the xenon tube 32, and is provided with a variable inductor 82 between the xenon tube and a conventional flashing circuit 81 for causing the xenon tube 32 to emit light and the value thereof is controlled by an inductance changing circuit 83 on the basis of the output of the controlling circuit 44.

Figure 16:
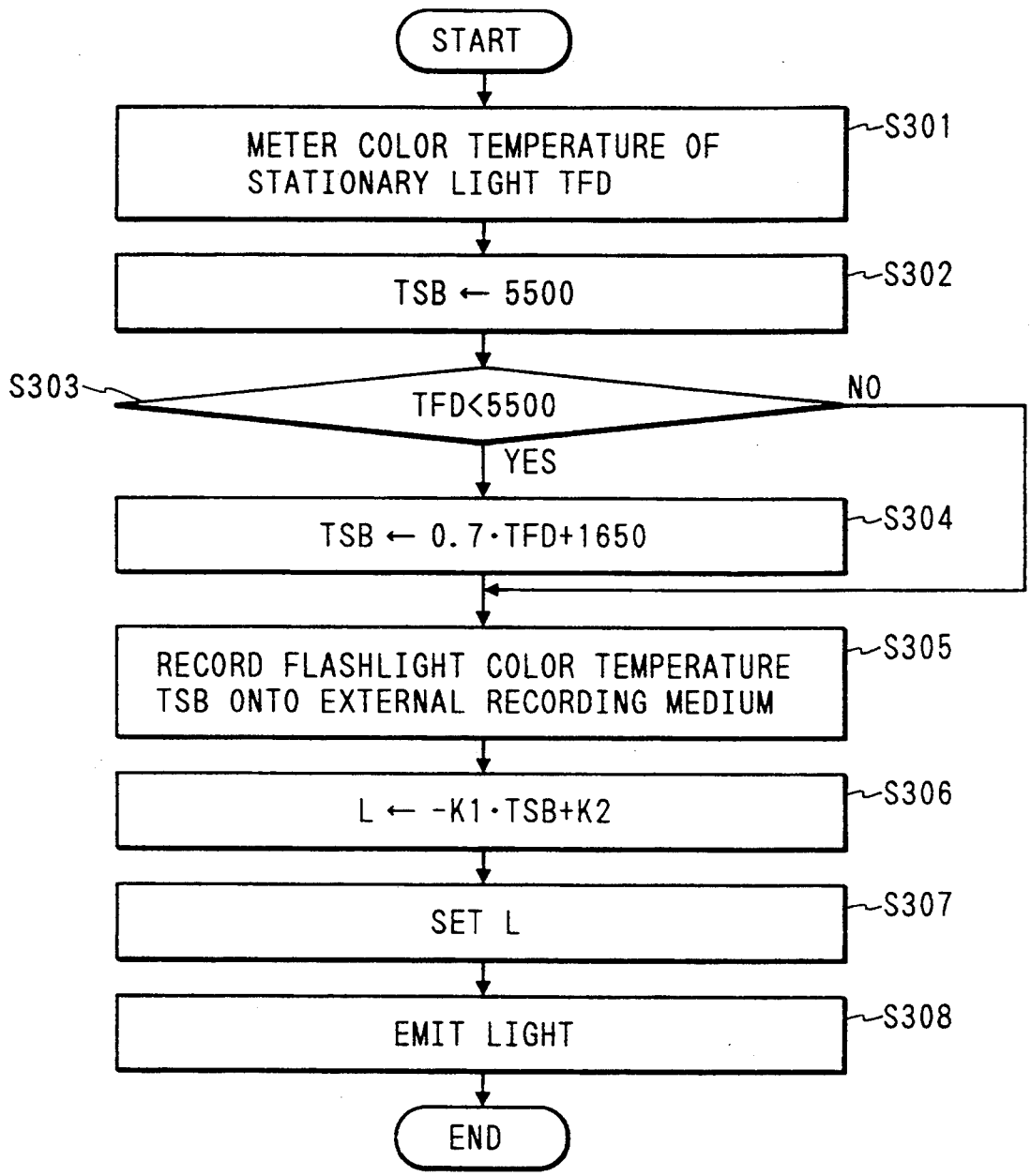
FIG. 16 is a flow chart showing flashlight color temperature control and a program for effecting the information recording control thereof.

FIG. 16 is a flow chart showing a control program executed by the controlling circuit 44. The operation of the present embodiment will hereinafter be described with reference to this flow chart.

At a step S301, the color temperature TFD of stationary light is metered by the stationary light color temperature metering circuit 71. At the next step S302, the color temperature TSB of the flashlight source is set to 5500[K]. At a step S303, whether the color temperature TFD of stationary light is less than 5500[K] is discriminated, and if the color temperature TFD is less than 5500[K], advance is made to a step S304, and if not so, the step S304 is skipped over.

At the step S304, the color temperature TSB of the flashlight source is calculated from the following equation:

$$TSB = 0.7 \cdot TFD + 1650 \qquad (3)$$

At a step S305, the calculated color temperature TSB of the flashlight source is recorded on the film 9 through the recording circuit 50. At a step S306, the inductance L of the inductor 82 is calculated from the following equation:

$$L = -K1 \cdot TSB + K2, \qquad (4)$$

where K1 and K2 are constants determined when the circuit system is designed.

At a step S307, the inductance L is changed into the calculated value by the inductance changing circuit 83. At a step S308, the electronic flash device 31 is caused to emit light, whereby light modulation is effected.

Figure 17:
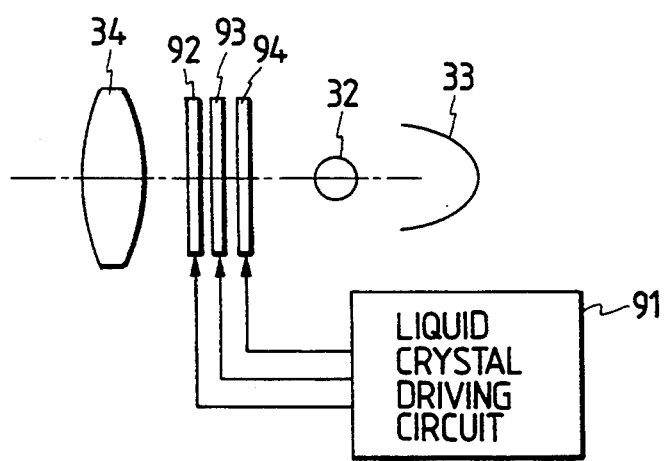
FIG. 17 shows another example of the flashlight color temperature changing portion.

FIG. 17 shows another embodiment of the flashlight color temperature changing portion 72.

In this embodiment, color temperature changing filters 92–94 are disposed forwardly of the xenon tube 32 to change the color temperature of the flashlight after emitted.

The color temperature changing filters 92–94 are guest-host type liquid crystal, and when a voltage is applied thereto from a liquid crystal driving circuit 91, the filters 92, 93 and 94 are colored into red, green and blue, respectively. These three kinds of filters 92–94 are combined to thereby change the color temperature of the flashlight emitted from the xenon tube 32.

Figure 18:
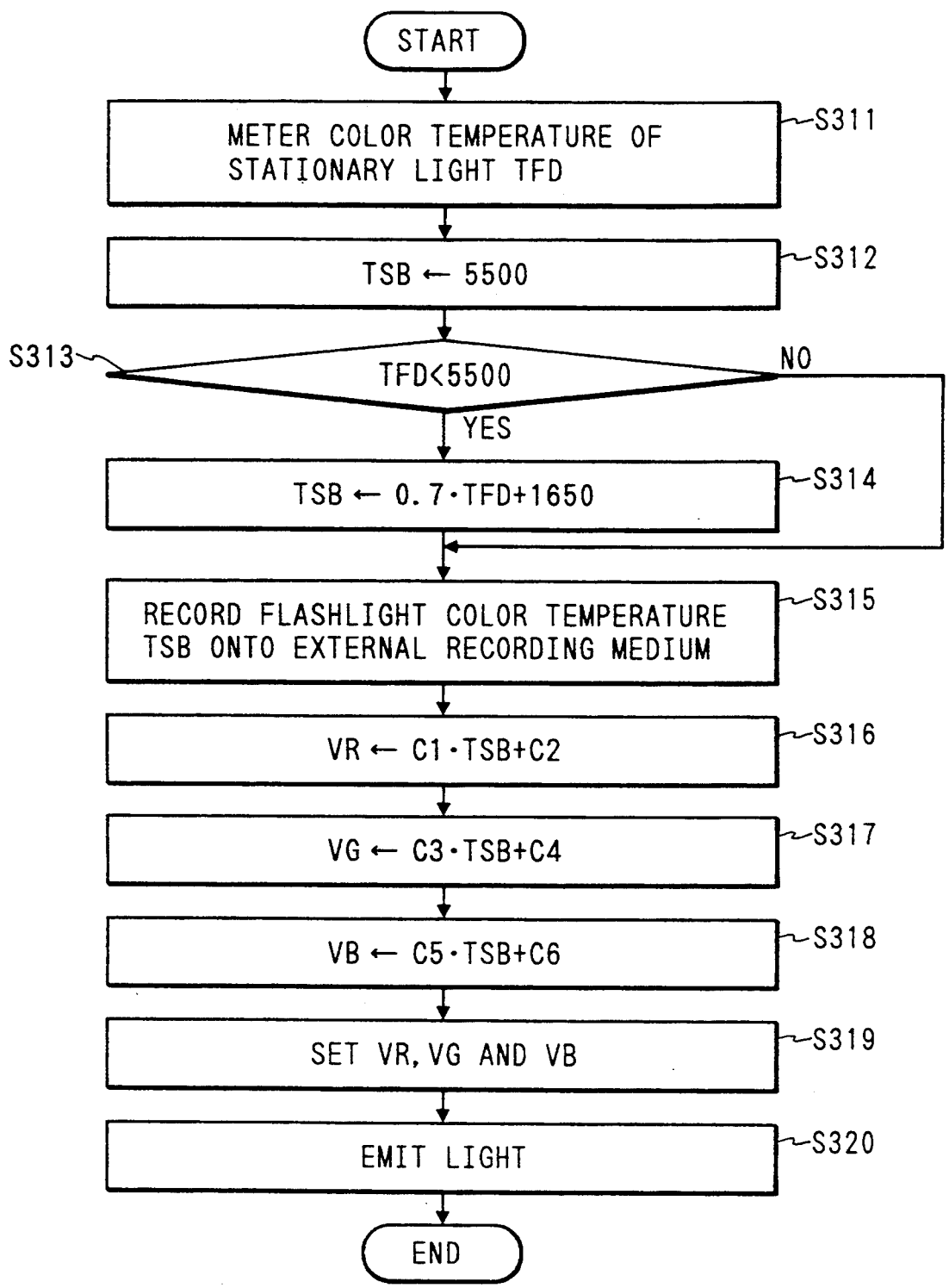
FIG. 18 is a flow chart showing the flashlight color temperature control of the flashlight color temperature changing portion shown in FIG. 17 and a program for effecting the information recording control thereof.

FIG. 18 is a flow chart showing a control program when the flashlight color temperature changing portion 72 is used. The operation will hereinafter be described with reference to this flow chart.

At a step S311, the color temperature of stationary light is metered, and at the next step S312, the color temperature TSB of the flashlight source is set to 5500[K]. At a step S313, whether the color temperature TFD of stationary light is less than 5500[K] is discriminated, and if the color temperature TFD is less than 5500[K], advance is made to a step S314, and if not so, the step S314 is skipped over.

At the step S314, the color temperature TSB of the flashlight source is calculated from equation (3) above. At a step S315, the calculated color temperature TSB of the flashlight source is recorded onto the film 9 through the recording circuit 50. At a step S316, the voltage VR applied to the liquid crystal 92 by the liquid crystal driving circuit 91 is calculated from the following equation:

$$VR = -C1 \cdot TSB + C2, \qquad (5)$$

where C1 and C2 are constants determined when the circuit system is designed.

At a step S317, the voltage VG applied to the liquid crystal 93 by the liquid crystal driving circuit 91 is calculated from the following equation:

$$VG = -C3 \cdot TSB + C4 \qquad (6)$$

where C3 and C4 are constants determined when the circuit system is designed.

At a step S318, the voltage VB applied to the liquid crystal 94 by the liquid crystal driving circuit 91 is calculated from the following equation:

$$VB = -C5 \cdot TSB + C6 \qquad (7)$$

where C5 and C6 are constants determined when the circuit system is designed.

At a step S319, the voltages VR, VG and VB are set by the liquid crystal driving circuit 91, and at the next step S320, light is emitted to effect light control, thus terminating the program.

As described above, design is made such that the color temperature of the natural light in the object field is metered by the color temperature metering element 35 and the stationary light color temperature metering circuit 71 and the color temperature of the flashlight source of the electronic flash device 31 is calculated on the basis of the metered color temperature and in accordance with the result of this calculation, the color temperature of the flashlight source is changed by the flashlight color temperature changing portion 72 and also the result of the calculation is magnetically recorded on the magnetic track applied onto the film 9 Therefore, the balance between the color temperatures of the main object and its background is adjusted into an optimum condition, and a natural photograph is obtained irrespective of the color temperature of the background. That is, the color temperature of the flashlight source is changed toward the color temperature of natural light, whereby when the background is an evening glow or tungsten illumination, a person also becomes somewhat reddish and the unnaturalness as in the prior art is eliminated.

Further, that color temperature information is transmitted to the lab so that during the printing in the lab, color balance correction can further be effected if required on the basis of the color temperature of the flashlight source. Therefore photographs of optimum tinge can be printed.

In the above-described embodiment, the external recording medium has been described as a magnetic track applied onto film, but alternatively, a magnetic recording medium may be applied to the surface of a film cartridge and information may be recorded thereon, or information may be recorded in a memory device such as an IC card.

The information recording system is not restricted to a magnetic recording system, but information may be optically recorded, for example, on film. In the construction of the above-described embodiment, the electronic flash device constitutes flashing means, the color temperature metering element 35 and the stationary light color temperature metering circuit 71 together constitute color temperature metering means, the controlling circuit 44 constitutes flashlight color temperature calculating means, the flashlight color temperature changing portion 72, the inductor 82, the inductance changing circuit 83, the liquid crystal driving circuit 91 and the filters 92–94 together constitute flashlight color temperature adjusting means, the film 9 constitutes a recording medium, and the recording device 12 and the recording circuit 50 together constitute recording means.

As described above, according to the present invention, design is made such that the color temperature of the natural light in the object field is metered and the color temperature of the flashlight source is calculated on the basis of the metered color temperature and in accordance with the result of this calculation, the color temperature of the flashlight source is adjusted and also the result of the calculation is recorded on the recording medium and therefore, the balance between the color temperatures of the main object and its background is adjusted into an optimum condition and natural photographs are obtained irrespective of the color temperature of the background. That is, the color temperature of the flashlight source is changed toward the color temperature of natural light, whereby when the background is an evening glow or tungsten illumination, a person becomes somewhat reddish and the unnaturalness as in the prior art is eliminated. Also, when the metered color temperature of natural light is 5500[K]or higher, the color temperature of the flashlight source is fixed at 5500[K]and therefore, the generally disliked phenomenon of a person becoming bluish is avoided.

Further, the information of that color temperature is recorded on the recording medium such as film and is transmitted to the lab. Therefore during the printing in the lab, color balance correction can further be effected, if required, on the basis of the flashlight source. Therefore phootgraphs of optimum tinge can be printed.

What is claimed is:

1. Camera apparatus comprising:
   a flashing device to illuminate an object field;
   a color temperature metering device to meter the color temperature of natural light in said object field;
   a flashlight color temperature calculating device to calculate an emission color temperature of a light source of said flashing device based on the metered color temperature of said natural light;
   a flashlight color temperature adjusting device to adjust the emission color temperature of the light source of said flashing device to the emission color temperature calculated by said flashlight color temperature calculating device; and
   a recording device to record the emission color temperature calculated by said flashlight color temperature calculating device onto a recording medium.

2. Camera apparatus according to claim 1 wherein said recording device magnetically records the calculated emission color temperature onto said recording medium.

3. Camera apparatus according to claim 1, wherein said recording medium is silver salt film and said recording device optically records the calculated emission color temperature onto the film.

4. Camera apparatus according to claim 1, wherein said recording device records the calculated emission color temperature prior to a corresponding flashlight emission.

5. Camera apparatus according to claim 1, wherein said color temperature metering device is provided in said flashing device.

6. Camera apparatus according to claim 1, wherein said flashlight color temperature calculating device is provided in a camera body.

7. Camera apparatus according to claim 1, wherein said flashlight color temperature adjusting device is provided in said flashing device.

8. Camera apparatus according to claim 1 wherein said recording device is provided in a camera body.

9. Camera apparatus according to claim 1, wherein said flashing device has three liquid crystal filters on an optical axis of a light emission tube.

10. Camera apparatus according to claim 9, wherein said flashing device has a liquid crystal filter driving circuit for coloring said liquid crystal filters.

11. Camera apparatus according to claim 1, wherein said flashing device is removably mountable to a camera body.

12. Camera apparatus according to claim 11, wherein at least one of said color temperature metering device and said flashlight color temperature adjusting device is provided in said flashing device, and said flashlight color temperature calculating device is provided in the camera body.

13. Camera apparatus according to claim 1, wherein said recording medium is camera film and said recording device optically records the calculated emission color temperature onto the film.

* * * * *